(12) United States Patent
Zolli et al.

(10) Patent No.: US 9,989,289 B2
(45) Date of Patent: Jun. 5, 2018

(54) CONDENSER UNIT

(71) Applicant: National Refrigeration & Air Conditioning Canada Corp., Brantford (CA)

(72) Inventors: Vince Zolli, Brantford (CA); William J. Mead, Paris (CA); Gerald Wallet, Harley (CA)

(73) Assignee: National Refrigeration & Air Conditioning Corp., Brantford, ON (CA)

( * ) Notice: Subject to any disclaimer, the term of this patent is extended or adjusted under 35 U.S.C. 154(b) by 205 days.

(21) Appl. No.: 14/178,813

(22) Filed: Feb. 12, 2014

(65) Prior Publication Data

US 2014/0223934 A1 Aug. 14, 2014

Related U.S. Application Data

(60) Provisional application No. 61/763,723, filed on Feb. 12, 2013.

(51) Int. Cl.
*F25B 49/02* (2006.01)
*F25B 39/04* (2006.01)

(52) U.S. Cl.
CPC .......... *F25B 49/027* (2013.01); *F25B 39/04* (2013.01); *F25B 2600/111* (2013.01); *F25B 2600/17* (2013.01); *F25B 2700/1931* (2013.01); *Y02B 30/743* (2013.01)

(58) Field of Classification Search
CPC .. F25B 39/04; F25B 49/027; F25B 2600/111; F25B 2600/17; F25B 2700/1931; F25B 2700/2106; F25B 2700/21163; Y02B 30/743; Y10S 62/17
See application file for complete search history.

(56) References Cited

U.S. PATENT DOCUMENTS

| | | | | |
|---|---|---|---|---|
| 2,203,509 A * | 6/1940 | Kitto | ..................... | F25B 47/027 62/110 |
| 2,224,877 A * | 12/1940 | McNulty | ................... | F28B 1/00 165/100 |
| 2,952,991 A * | 9/1960 | St Pierre | ................ | F25B 49/027 62/181 |
| 3,299,650 A | 1/1967 | Kramer | | |
| 3,354,665 A | 11/1967 | Lewis | | |
| 3,368,364 A * | 2/1968 | Norton | ..................... | F25B 41/04 62/117 |

(Continued)

*Primary Examiner* — Frantz Jules
*Assistant Examiner* — Martha Tadesse (57) ABSTRACT

A condenser unit including a compressor for compressing a refrigerant vapor to provide a superheated refrigerant vapor exerting a head pressure, and a condenser for receiving the superheated refrigerant vapor and condensing the superheated refrigerant vapor therein, the condenser being located in an uncontrolled space with air therein at an ambient temperature. The condenser unit also includes a flow control means for controlling flow of the superheated refrigerant vapor from the compressor into the condenser, a rotatable condenser fan for moving air past the condenser to dissipate heat from the condenser, and a controller for controlling the flow control means and the speed of rotation of the condenser fan based on at least one preselected parameter, to maintain the head pressure within a predetermined range thereof.

20 Claims, 7 Drawing Sheets

(56) References Cited

U.S. PATENT DOCUMENTS

| | | | | |
|---|---|---|---|---|
| 3,481,152 A | * | 12/1969 | Seeley | F24F 5/00 62/183 |
| 3,939,668 A | * | 2/1976 | Morris | F25B 41/00 62/117 |
| 3,958,429 A | * | 5/1976 | Kirsch | F25B 49/027 62/184 |
| 3,977,205 A | * | 8/1976 | Dreisziger | F25B 5/02 62/117 |
| 4,007,605 A | | 2/1977 | Denny | |
| 4,120,173 A | * | 10/1978 | Kimpel | F25B 49/027 62/181 |
| 4,123,914 A | * | 11/1978 | Perez | F25B 5/02 62/196.4 |
| 4,193,781 A | | 3/1980 | Vogel et al. | |
| 4,240,266 A | * | 12/1980 | Scrine | F16K 39/022 251/282 |
| 4,286,437 A | * | 9/1981 | Abraham | F25B 1/00 62/151 |
| 4,373,348 A | * | 2/1983 | Ibrahim | F25B 1/00 62/115 |
| 4,523,435 A | * | 6/1985 | Lord | F25B 41/062 236/78 D |
| 4,735,059 A | | 4/1988 | O'Neal | |
| 5,150,581 A | | 9/1992 | Smith | |
| 5,247,805 A | | 9/1993 | Dennis | |
| 5,333,469 A | * | 8/1994 | Hullar | F25B 41/006 62/181 |
| 5,435,148 A | * | 7/1995 | Sandofsky | F04C 14/08 62/197 |
| 5,660,050 A | | 8/1997 | Wilson et al. | |
| 5,749,237 A | * | 5/1998 | Sandofsky | F04C 14/08 62/209 |
| 5,752,389 A | * | 5/1998 | Harper | F24F 3/153 62/176.5 |
| 5,802,860 A | * | 9/1998 | Barrows | F25B 41/04 62/126 |
| 6,089,033 A | | 7/2000 | Dube | |
| 6,216,481 B1 | | 4/2001 | Kantchev | |
| 7,228,706 B1 | | 6/2007 | Xu | |
| 7,246,500 B2 | | 7/2007 | Singh et al. | |
| 7,559,207 B2 | | 7/2009 | Knight et al. | |
| 7,845,183 B2 | | 12/2010 | Singh et al. | |
| 8,051,668 B2 | | 11/2011 | Singh et al. | |
| 8,327,656 B2 | | 12/2012 | Tutunoglu et al. | |
| 2003/0014986 A1 | * | 1/2003 | Crane | F25B 49/022 62/183 |
| 2006/0288713 A1 | | 12/2006 | Knight et al. | |
| 2008/0083237 A1 | * | 4/2008 | Street | F25B 49/027 62/196.4 |
| 2008/0173035 A1 | * | 7/2008 | Thayer | F24F 3/153 62/173 |
| 2008/0229764 A1 | * | 9/2008 | Taras | F24F 3/153 62/90 |
| 2010/0192618 A1 | | 8/2010 | Zolli et al. | |
| 2010/0211228 A1 | * | 8/2010 | Chao | F25B 49/027 700/282 |
| 2011/0167846 A1 | * | 7/2011 | Knight | F24F 3/153 62/93 |
| 2013/0139529 A1 | | 6/2013 | Lu et al. | |

* cited by examiner

CONDENSER UNIT

This application claims the benefit of U.S. Provisional Patent Application No. 61/763,723, filed on Feb. 12, 2013, the disclosure of which is fully incorporated herein by reference.

FIELD OF THE INVENTION

The present invention is a condenser unit including a controller for controlling rotation of a condenser fan and a flow control means controlling flow of refrigerant into the condenser, based on one or more preselected parameters, to maintain head pressure within a predetermined range thereof.

BACKGROUND OF THE INVENTION

In some prior art vapor-compression refrigeration systems, a condenser thereof is positioned outdoors, to take advantage of relatively low ambient temperatures. When the ambient temperature is relatively low, advantageously, heat dissipation from the condenser is aided by the relatively low ambient temperature. In these circumstances, within a range of ambient temperatures, there is a direct relationship between the ambient temperature at the condenser and the efficiency of the system overall: the colder the ambient temperature, the lower the condenser head pressure, and the more efficiently the system operates.

Figure 1:
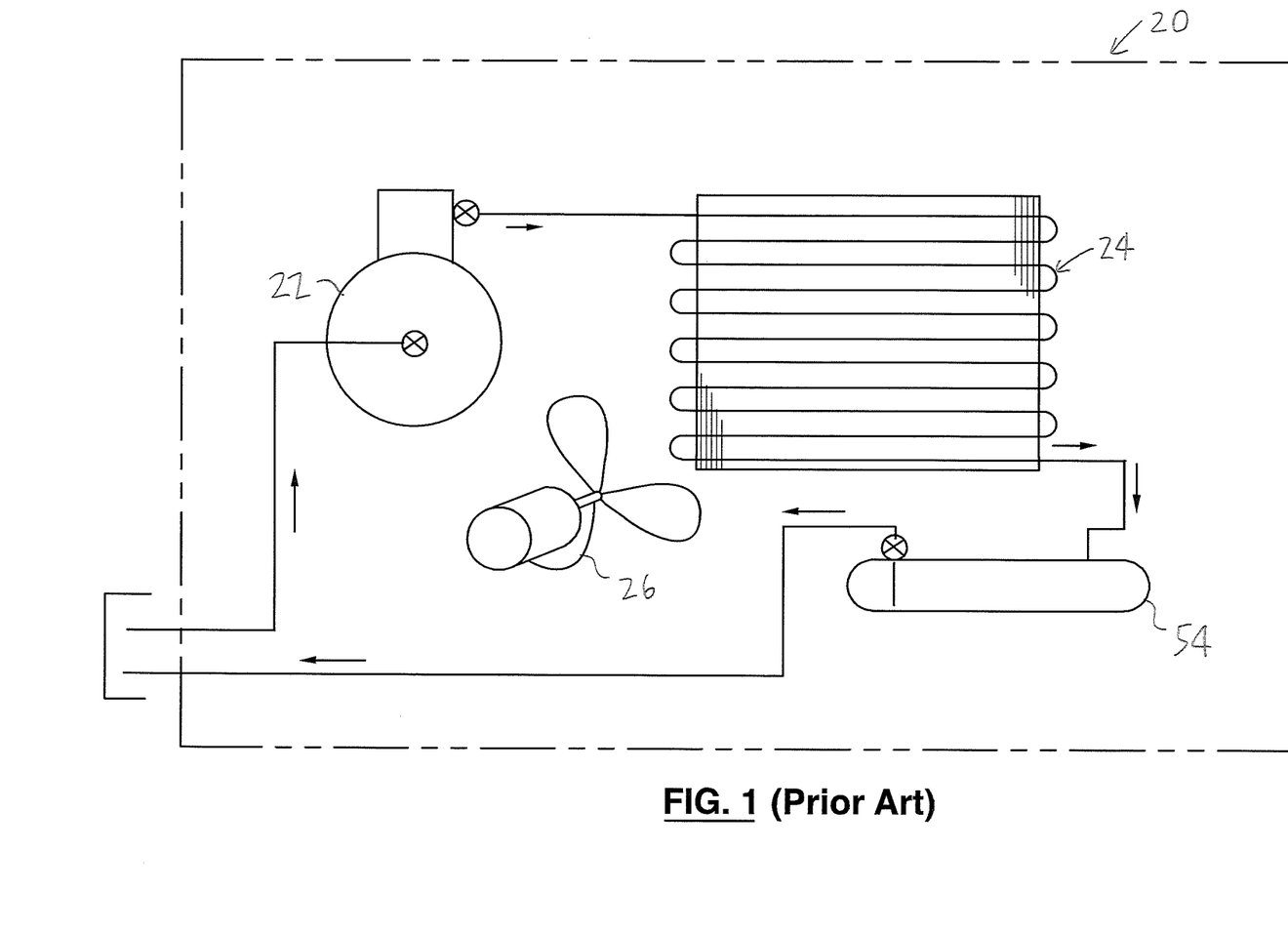
FIG. 1 (also described previously) is a schematic diagram of a prior art condenser unit.

A typical condenser unit 20 of the prior art is schematically illustrated in FIG. 1. As can be seen in FIG. 1, the prior art condenser unit 20 typically includes a compressor 22, a condenser 24, a condenser fan 26 for directing air through or over the condenser 24 to cool the refrigerant therein (not shown), and it may also include a liquid receiver 54. As is well known in the art, the condenser unit is included in a vapor-compression system, e.g., used for refrigeration. In the refrigeration system, the refrigerant is circulatable through an evaporator (not shown in FIG. 1), which is in fluid communication with a substantially closed controlled space. The refrigerant is circulatable through the evaporator for heat transfer from air in the controlled space to the refrigerant, as is known.

Refrigerant vapor is pumped from the evaporator to the compressor 22, and the superheated vapor discharged from the compressor 22 is directed to the condenser 24, where the refrigerant condenses. Often, the condenser 24 may be located outside the building in which the controlled space is located, i.e., the condenser is located in an uncontrolled space. Heat given off on condensation of the refrigerant in the condenser is dissipated to the atmosphere, and the liquid refrigerant is directed from the condenser 24 to the liquid receiver 54, which contains a reservoir of the liquid refrigerant. The condenser fan 26 aids in the dissipation of heat to the atmosphere. From the liquid receiver 54, the liquid refrigerant is drawn toward the expansion valve (not shown) of the system.

As is well known in the art, proper operation of the system requires a minimum pressure difference across the expansion valve. However, in the prior art condenser unit as illustrated in FIG. 1, fluctuations in the ambient temperature in the uncontrolled space result in fluctuations in the compressor discharge (or head) pressure, adversely affecting efficiency, and the performance of the system overall. When the ambient temperature is very low, the head pressure could become so low that the system does not function properly.

Figure 2:
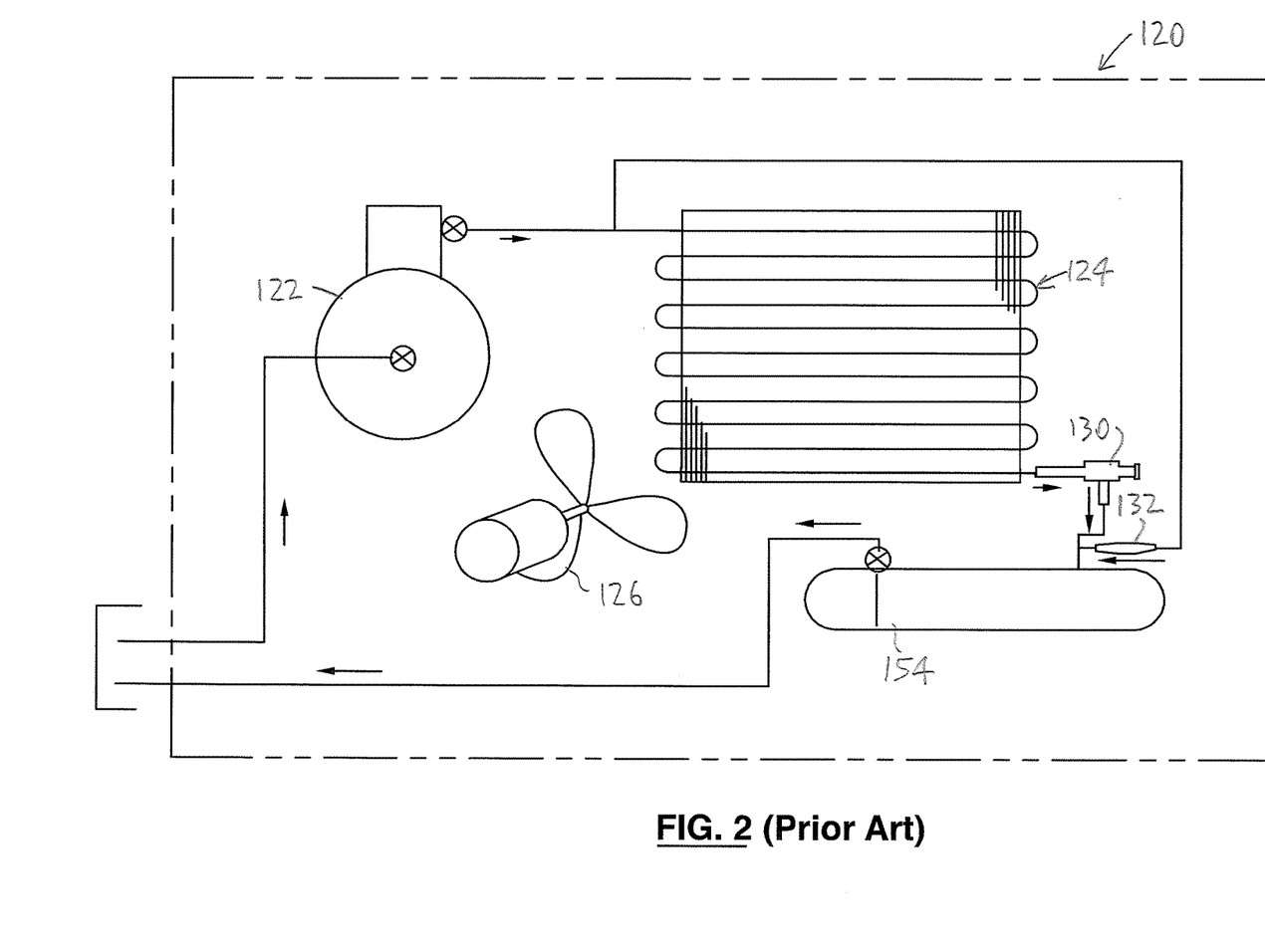
FIG. 2 (also described previously) is a schematic diagram of another prior art condenser unit.

In the prior art, the problem of fluctuations in the ambient temperature is typically addressed by using a flooding valve. A prior art condenser unit 120 is schematically illustrated in FIG. 2. (As will be described, the remainder of the drawings illustrate the present invention.)

The condenser unit 120 typically includes a compressor 122, a condenser 124, a condenser fan 126, and a liquid receiver 154 (FIG. 2). However, as can be seen in FIG. 2, the condenser unit 120 also includes a flooding valve 130. The flooding valve 130 is positioned to control the flow of liquid refrigerant from the condenser 124.

As is well known in the art, the flooding valve causes liquid refrigerant to back up into (i.e., flood) the condenser, when the head pressure falls below a preselected head pressure. Because flooding the condenser limits the surface area inside the condenser on which the refrigerant may condense, the flooding results in an increase in condensing pressure, i.e., head pressure.

As illustrated in FIG. 2, the prior art condenser unit 120 typically also includes a bypass valve 132. The bypass valve 132 is provided because the flooding valve reduces the flow of refrigerant to the receiver. The bypass valve 132 permits the superheated refrigerant vapor to bypass the condenser when a predetermined pressure difference between the compressor's discharge line and the receiver exists.

However, there are some disadvantages to the prior art solutions intended to address fluctuating ambient temperatures at the condenser that affect the refrigerant head pressure. For instance, the flooding valve, in effect, requires the compressor to function at an artificially high level (i.e., energy consumption by the compressor is greater than it otherwise would have been). Also, because of the flooding valve, significantly more liquid refrigerant is required to be added to the system. This is undesirable for two reasons. First, adding more refrigerant results in additional costs, due to the cost of the additional refrigerant. Second, due to issues involving the environmental impact of refrigerants, it is generally thought to be desirable to decrease refrigerant volume requirements.

SUMMARY OF THE INVENTION

There is a need for a condenser unit that overcomes or mitigates one or more of the disadvantages or defects of the prior art. Such disadvantages or defects are not necessarily included in those described above.

In its broad aspect, the invention provides a condenser unit including a compressor for compressing a refrigerant vapor to provide a superheated refrigerant vapor exerting a head pressure and a condenser for receiving the superheated refrigerant vapor and condensing the superheated refrigerant vapor therein to a liquid refrigerant to release heat therefrom upon the condensation thereof, the condenser being located in an uncontrolled space with air therein at an ambient temperature. The condenser unit also includes a flow control means for controlling flow of the superheated refrigerant vapor from the compressor into the condenser and a condenser fan rotated by a condenser fan motor, for moving air past the condenser, to dissipate heat from the condenser. In addition, the condenser unit includes a condenser control circuit for controlling the flow control means, a fan control circuit for controlling the speed of rotation of the condenser fan, and a controller for controlling the flow control means and the speed of rotation of the condenser fan via the condenser control circuit and the fan control circuit respectively, based on at least one preselected parameter, to maintain the head pressure within a predetermined range thereof.

In another aspect, the invention provides a refrigeration system in which a refrigerant is circulatable to transfer heat out of a volume of air in a controlled space. The refrigeration system includes a compressor for compressing a refrigerant vapor circulatable therethrough to provide a superheated refrigerant vapor exerting a head pressure and a condenser for receiving the superheated refrigerant vapor and condensing the superheated refrigerant vapor therein to a liquid refrigerant to release heat therefrom upon the condensation thereof, the condenser being located in an uncontrolled space with the air therein at an ambient temperature. The system also includes an evaporator assembly through which the refrigerant is circulatable for heat transfer from the air in the controlled space to the refrigerant, as well as a flow control means for controlling flow of the superheated refrigerant vapor from the compressor into the condenser, and a condenser fan rotated by a condenser fan motor, for moving air past the condenser, to dissipate heat from the condenser. In addition, the system includes a condenser control circuit for controlling the flow control means, a fan control circuit for controlling the speed of rotation of the condenser fan, and a controller for controlling the condenser control circuit and the fan control circuit based on at least one preselected parameter, to maintain the head pressure within a predetermined range thereof.

In yet another aspect, the invention provides a method of operating a condenser unit through which a refrigerant is circulatable. The method includes compressing the refrigerant in a compressor included in the condenser unit to provide a superheated refrigerant vapor exerting a head pressure. The superheated refrigerant vapor is condensed in a condenser included in the condenser unit to provide a liquid refrigerant, the condenser being located in an uncontrolled space in which air is at an ambient temperature. Via a condenser control circuit, the rate at which the superheated refrigerant vapor flows into the condenser is controlled by a flow control means. Via a fan control circuit, the rate at which the refrigerant condenses in the condenser is controlled by controlling a condenser fan motor included in the condenser unit to change a speed of rotation of a condenser fan positioned to move the air over the condenser. With a controller, the flow control means and the condenser fan motor are controlled via the condenser control circuit and the fan control circuit respectively, based on at least one preselected parameter, to maintain the head pressure within a predetermined range thereof.

In another of its aspects, the invention provides a method of operating a refrigeration system in which a refrigerant is circulatable to transfer heat out of a volume of air in a controlled space. The method includes compressing the refrigerant in a compressor included in the condenser unit to provide a superheated refrigerant vapor exerting a head pressure. The superheated refrigerant vapor is condensed in a condenser included in the condenser unit to provide a liquid refrigerant, the condenser being located in an uncontrolled space in which the air is at an ambient temperature. The refrigerant is caused to at least partially evaporate in an evaporator assembly through which the refrigerant is circulatable, to transfer heat to the refrigerant from the air in the controlled space. Via a condenser control circuit, the rate at which the superheated refrigerant vapor flows into the condenser is controlled by a flow control means. Via a fan control circuit, the rate at which the refrigerant condenses in the condenser is controlled by controlling a condenser fan motor included in the condenser unit to change a speed of rotation of a condenser fan positioned to move the air over the condenser. With a controller, the flow control means and the condenser fan motor are controlled via the condenser control circuit and the fan control circuit respectively, based on at least one preselected parameter to maintain the head pressure within a predetermined range thereof.

BRIEF DESCRIPTION OF THE DRAWINGS

The invention will be better understood with reference to the attached drawings, in which.

DETAILED DESCRIPTION

Figure 3:
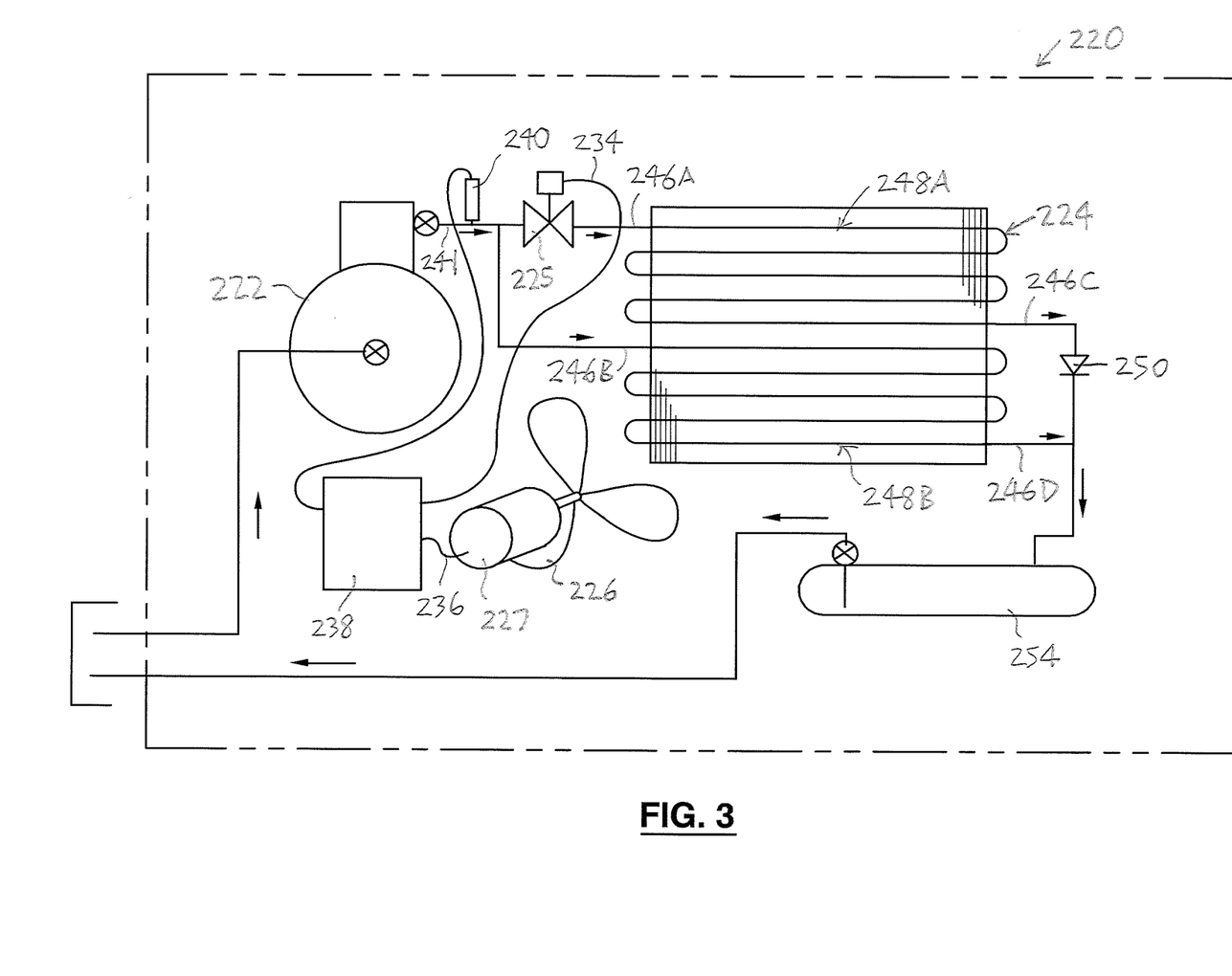
FIG. 3 is a schematic diagram of an embodiment of the condenser unit of the invention.
Figure 4A:
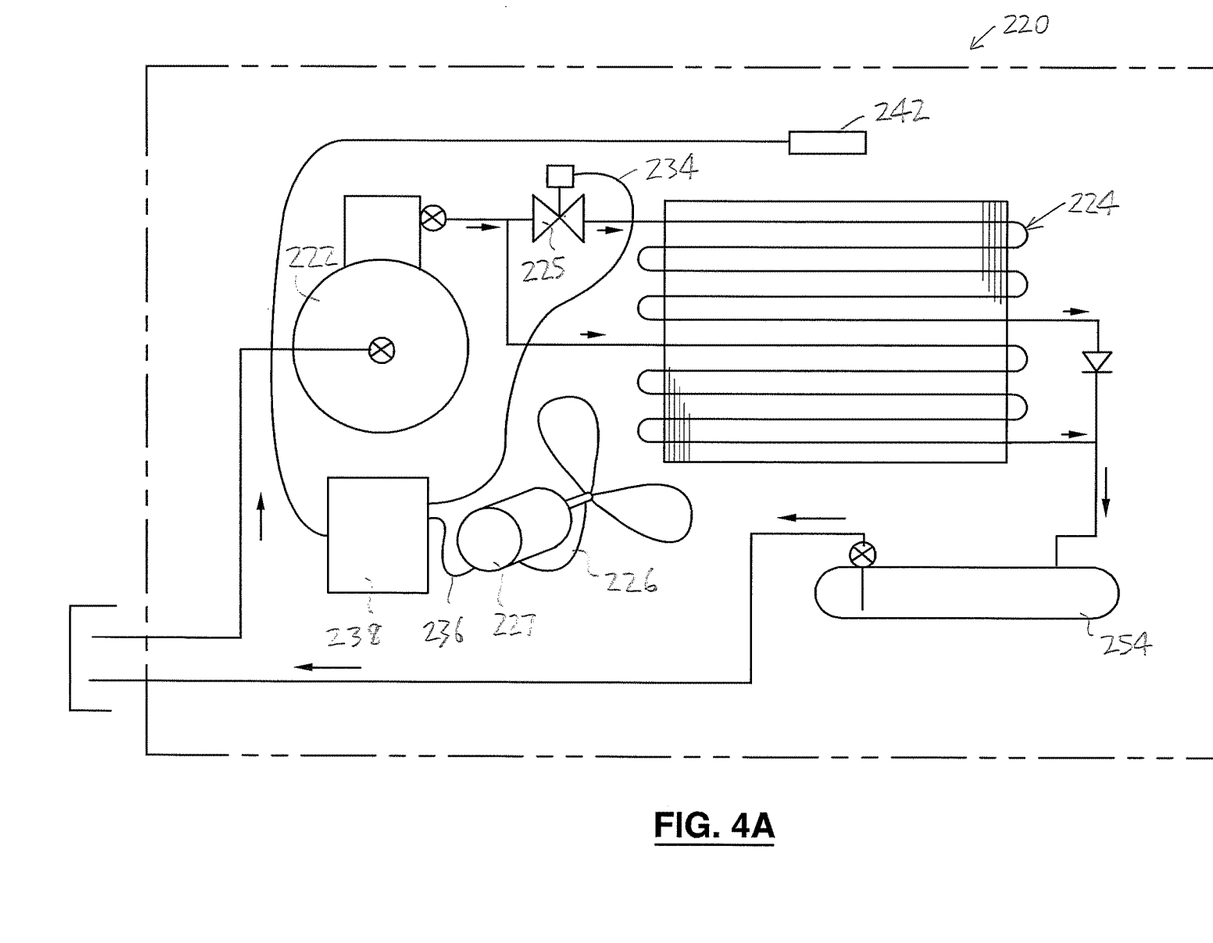
FIG. 4A is a schematic diagram of an alternative embodiment of the condenser unit of the invention.
Figure 4B:
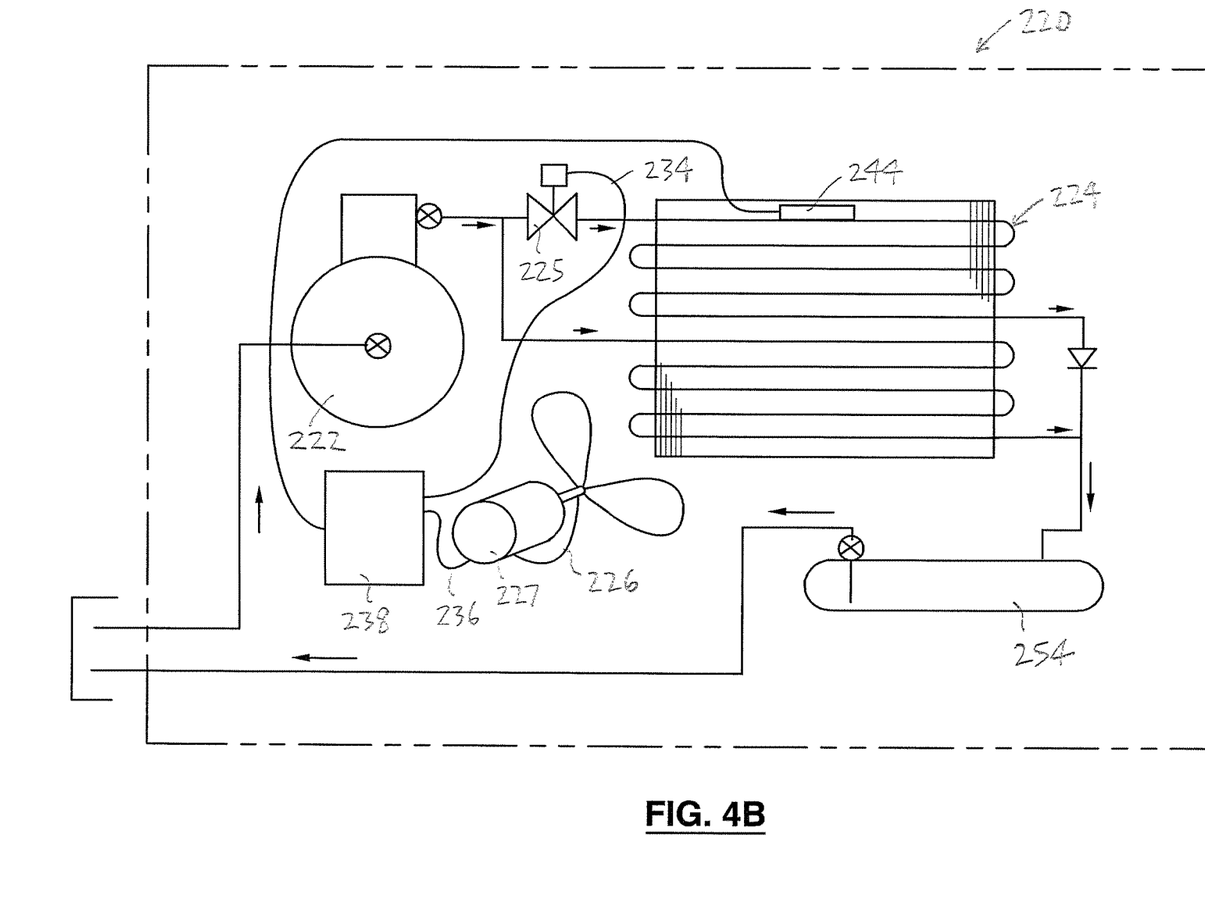
FIG. 4B is a schematic diagram of an alternative embodiment of the condenser unit of the invention.
Figure 5:
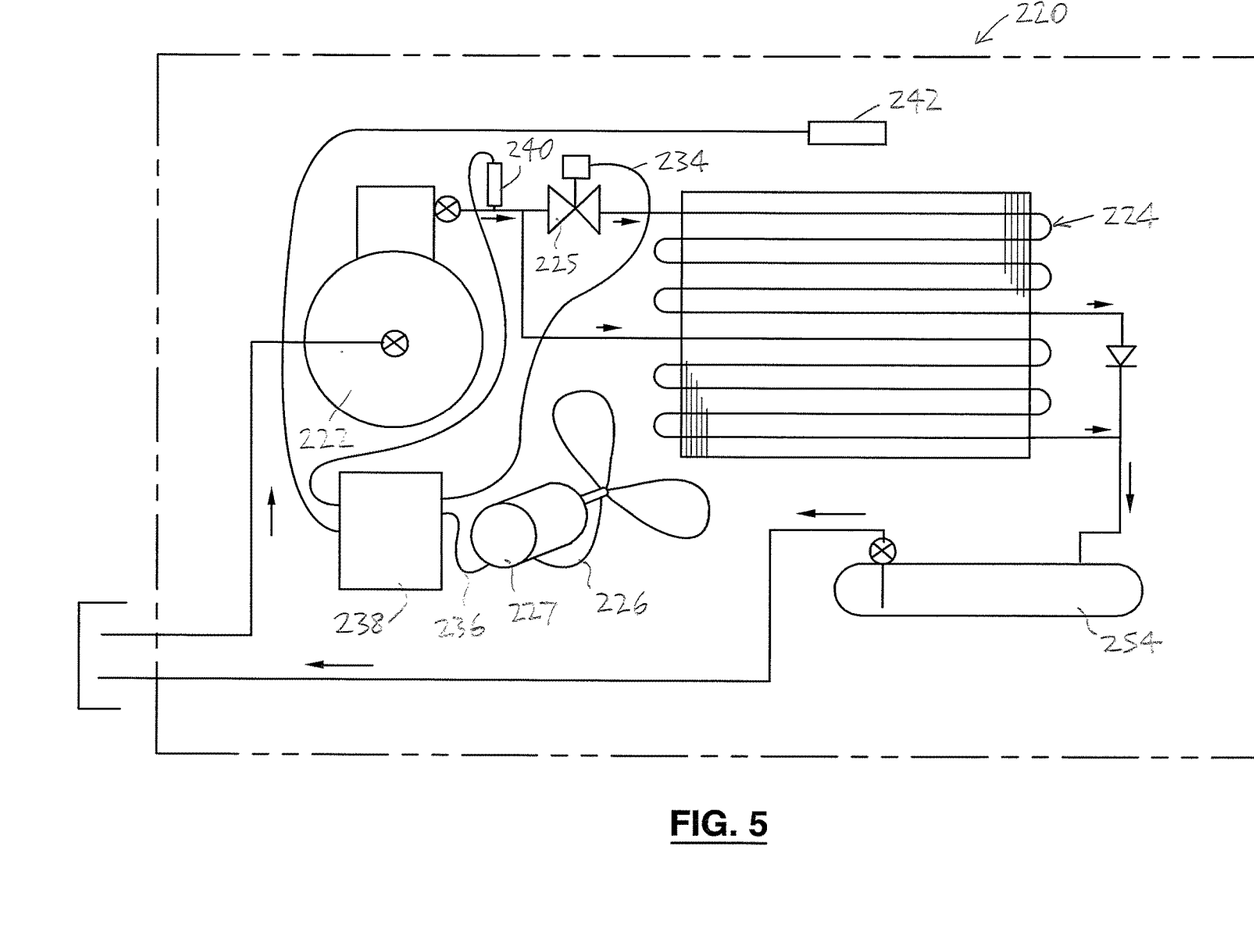
FIG. 5 is a schematic diagram of another alternative embodiment of the condenser unit of the invention.

In the attached drawings, like reference numerals designate corresponding elements throughout. To simplify the description, the reference numerals used in FIGS. 1 and 2 will be used again, except that each such reference numeral is raised by 100 (or multiples thereof, as the case may be), where the elements described correspond generally to prior art elements already described. Reference is first made to FIGS. 3-5 to describe an embodiment of a condenser unit of the invention referred to generally by the numeral 220. In one embodiment, the condenser unit 220 includes a compressor 222 for compressing a refrigerant vapor (not shown) to provide a superheated refrigerant vapor exerting a head pressure, and a condenser 224 for receiving the superheated refrigerant vapor and condensing the superheated refrigerant vapor therein to a liquid refrigerant, to release heat therefrom upon the condensation of the refrigerant vapor. As will be described, the condenser 224 is located in an uncontrolled space with air therein at an ambient temperature. Preferably, the condenser unit 220 also includes a flow control means 225 for controlling flow of the superheated refrigerant vapor from the compressor 222 into the condenser 224, as will also be described. In one embodiment, the condenser unit 220 preferably also includes a condenser fan 226 rotated by a condenser fan motor 227, for moving air past the condenser 224, to dissipate heat from the condenser 224. In addition, the condenser unit 220 preferably also includes a condenser control circuit 234 for controlling the flow control means 225, and a fan control circuit 236 for controlling the speed of rotation of the condenser fan 226. It is also preferred that the condenser unit 220 includes a controller 238 for controlling the flow control means 225 and the speed of rotation of the condenser fan 226 via the condenser control circuit 234 and the fan control circuit 236 respectively, based on one or more preselected parameters, to maintain the head pressure within a predetermined range thereof. It will be understood that the condenser unit 220 preferably is included in a vapor compression refrigeration system 239 (FIG. 6), as will also be described.

It will also be understood that the refrigeration system of the invention includes only one compressor, one condenser, and one or more evaporators. Preferably, the system is either for a freezer or a cooler, i.e., it is not functioning as an air conditioning system. The condenser is positioned outdoors, and the evaporator is located to cool the air in a substantially closed controlled space. As described above, when the ambient temperature becomes relatively low, the head pressure tends to decrease, and it may decrease to the point where the refrigeration system does not function properly. The invention herein provides a system and a method for maintaining the head pressure notwithstanding a low ambient temperature. Those skilled in the art would appreciate that, for any particular vapor-compression refrigeration system, the head pressure preferably is maintained in a predetermined range determined according to the characteristics of the refrigeration system.

In one embodiment, the preselected parameter preferably is the head pressure. As can be seen in FIG. 3, in order to determine the head pressure at the discharge from the compressor 222, a transducer 240 is positioned in a line 241 connecting the compressor 222 and the condenser 224. Those skilled in the art would be aware of suitable transducers. Data about the head pressure from the transducer 240 is transmitted to the controller 238 for processing. In the same manner as described above, based on the head pressure data from the transducer 240, the controller 238 determines whether adjustments to the flow control means 225 and the speed of rotation of the condenser fan 226 are required. If so, then the necessary signals are transmitted via the condenser control circuit 234 and the fan control circuit 236.

The controller determines whether the head pressure as measured is below a preselected head pressure minimum value, referred to above as a "set point" value. For the purposes hereof, the set point value is the minimum head pressure at which the system can function properly. In the invention herein, if the preselected parameter, as measured, is such that the head pressure would be below the set point in the absence of any steps to increase or maintain the head pressure, then the flow control means and the condenser fan rotation speed are adjusted, in order to cause the head pressure to increase to an acceptable value, i.e., at the set point or greater.

As noted above, the head pressure preferably is maintained within the predetermined range, which may vary from one refrigeration system to another, depending on a variety of factors. For example, the condensing temperature may be allowed to vary between approximately 70° F. and approximately 130° F., corresponding to Refrigerant 404A head pressures of between approximately 150 psig and approximately 350 psig respectively.

The controller 238 preferably includes one or more suitable microprocessors (not shown), with appropriate software. Those skilled in the art would be aware of suitable microprocessors. Preferably, the transducer 240 provides the head pressure data repeatedly to the microprocessor(s) of the controller 238, on a very short periodic basis. Upon receipt of the information regarding the head pressure, the controller 238 determines the adjustments, if any, that should be made to the speed of rotation of the condenser fan 226 and to the flow control means 225, in order to maintain the head pressure within the predetermined range.

In another embodiment, the preselected parameter preferably is the ambient temperature. The ambient temperature preferably is determined by an ambient temperature sensor 242 (FIG. 4A). As can be seen in FIG. 4A, the temperature sensor 242 preferably is connected in any suitable manner with the controller 238, so that data about the ambient temperature is provided to the controller 238. Preferably, the ambient temperature data is provided at any suitable predetermined short periodic basis, for virtually constant monitoring. Preferably, the actual ambient temperature is compared by the controller 238 to a predetermined head pressure set point ambient temperature. The head pressure set point ambient temperature is predetermined in order to simplify the utilization of the ambient temperature data. For instance, the head pressure set point ambient temperature may be predetermined as the temperature at which the set point head pressure is achieved, under preselected, representative, conditions.

It is believed that measuring ambient temperature may result in a prompt response to unfavorable conditions, i.e., conditions in which the head pressure is below the set point. It is also believed that the first embodiment of the condenser unit 220, in which the transducer measures the actual head pressure (FIG. 3), is preferable because it provides for a relatively rapid detection of unfavorable conditions, and also a relatively rapid response. However, the cost of the ambient temperature sensor is significantly less than the cost of the transducer, used to determine head pressure. For this reason, the preselected parameter may be the ambient temperature in some situations.

If the actual ambient temperature is less than the head pressure set point ambient temperature, the controller 238 causes the corrective steps to be taken. As described above, the fan control circuit 236 decreases signal voltage supplied to the condenser fan motor 227, and the condenser control circuit 234 proceeds with apportionment of the condenser, by adjustment of the flow control means.

Those skilled in the art would appreciate that, for a particular system, when the ambient temperature is at a certain low ambient temperature, the head pressure is also correspondingly low, unless steps are taken (i.e., by decreasing the speed of rotation of the condenser fan 226, and by apportioning the condenser 224) to increase the head pressure. Based on the relationship in a particular system between a specific (low) ambient temperature and a specific (low) head pressure that would result in the absence of any steps taken to maintain the head pressure, the controller 238 can determine the adjustments needed in order to maintain the head pressure.

In another embodiment, the preselected parameter preferably is a temperature of the liquid refrigerant in the condenser 224. As is well known in the art, a condensing temperature (the temperature at which the refrigerant condenses in the condenser) is correlated to head pressure. Accordingly, the condensing temperature may be measured, instead of measuring the head pressure, to determine indirectly whether the head pressure is adequate. As can be seen in FIG. 4B, to determine the temperature of the liquid refrigerant in the condenser 224, a refrigerant temperature sensor 244 is positioned to determine such temperature. The sensor 244 preferably transmits the refrigerant temperature data to the controller 238. Preferably, the refrigerant temperature data is processed by the controller 238, i.e., based on the temperature of the refrigerant, the controller 238 may transmit signals via the condenser control circuit 234 and the fan control circuit 236, to cause the head pressure to be maintained as described above.

Preferably, the controller 238 receives the condensing temperature input data from the refrigerant temperature sensor 244. The condensing temperature as measured by the sensor 244 is compared by the controller 238 to a predetermined minimum condensing temperature that is correlated to the head pressure set point. If the temperature of the refrigerant is less than the predetermined minimum condensing temperature, then the controller 238 determines the extent to which the rotation of the fan should be slowed, and the appropriate adjustment to the flow control means that is needed in order to bring the head pressure to its set point, or to maintain the head pressure at an acceptable level. In the same manner as described above, the controller 238 transmits the appropriate signals to the fan motor 227 and to the flow control means 225 (i.e., via the fan control circuit 236 and the condenser control circuit 234 respectively) to adjust the speed of rotation of the fan and to apportion the condenser as needed to increase, or to maintain the head pressure, as the case may be.

Those skilled in the art would appreciate that the controller may be provided information about more than one parameter, to monitor (directly or otherwise) the status of the head pressure. For instance, in one embodiment, the preselected parameter(s) preferably include the head pressure and the ambient temperature. It will be understood that, for each parameter, the data is transmitted to the controller 238, which then transmits the appropriate signals to the condenser control circuit 234 and to the fan control circuit 236, if needed.

Where data for two preselected parameters (e.g., the ambient temperature and the head pressure) is provided to the controller, the data for each is evaluated to determine whether the condenser fan rotation speed and/or the apportionment of the condenser should be changed (and if so, by how much) to maintain the head pressure within the predetermined range. As noted above, data about each of the ambient temperature and the head pressure is provided to the controller on a frequent periodic basis, enabling the controller to monitor those parameters virtually constantly. For example, if either of the ambient temperature or the head pressure has changed significantly, the controller determines the impact of the change on the head pressure (if the parameter is ambient temperature) or simply determines the change in head pressure (i.e., if the parameter is head pressure) and implements the appropriate corresponding changes to the condenser fan rotation speed and the apportionment of the condenser, in order to maintain the head pressure within the predetermined range thereof. It is believed that, when two or more preselected parameters are monitored in this way, the more rapid and accurate response to changing conditions (i.e., ambient temperature and head pressure) is achievable.

In use, the transducer 240 measures the head pressure (i.e., where the preselected parameter is head pressure), and the relevant input data is transmitted to the controller 238. The controller 238 determines whether the head pressure is below the set point. When the head pressure is below the set point, the controller 238 transmits signals to the flow control means 225 and to the condenser fan 226 via the condenser control circuit 234 and the fan control circuit 236 respectively, to increase the head pressure.

For example, the speed of rotation of the condenser fan 226 preferably is decreased, and the effective volume of the condenser 224 is also decreased (i.e., by apportioning the condenser, as will be described), so as to utilize only a portion thereof. Each of these corrective steps preferably is activated by the controller 238 upon the controller's receipt of the relevant data, as described above. It will also be understood that these two corrective steps preferably are activated substantially simultaneously.

As noted above, decreasing the speed of rotation of the condenser fan tends to increase the condensing pressure. Accordingly, it is preferred that the speed of the condenser fan motor 227 is varied (i.e., decreased) in order to increase the head pressure. In addition to resulting in a higher head pressure, decreasing the speed of the electronically commutated condenser fan motor 227 promptly results in decreased energy consumption by the fan motor.

The extent to which the condenser fan's rotation speed is to be decreased depends in part on a pressure difference between the set point and the actual head pressure as measured by the transducer 240. Ideally, based at least on the pressure difference, and based on data correlating the condenser fan rotation speed with signal voltage provided to the condenser fan motor, the control circuit preferably determines the (lower) signal voltage that should be provided to the condenser fan motor in order to achieve a suitable (i.e., higher) head pressure. The signal voltage provided to the condenser fan motor is then adjusted accordingly. Specifically, the fan control circuit 236 causes the signal voltage supplied to the condenser fan motor to be limited accordingly.

As noted above, where the data provided does not include the actual head pressure, the controller 238 determines an estimated head pressure based on the data provided, e.g., the ambient temperature, or the refrigerant temperature. The controller then causes the appropriate signals to be sent to the flow control means 225 and the condenser fan motor 227 to maintain or increase the head pressure to the set point, as the case may be.

It is preferred that the fan motor is an electronically commutated motor because it permits very accurate control of the motor (i.e., of the fan speed), by the fan control circuit 236 adjusting the signal voltage supplied to the motor. The electronically commutated motor is programmed to operate at specific speeds (e.g., rpms) proportional to the signal voltage, and therefore provides very accurate control of air flow through the condenser in response to the actual head pressure being found to be below the set point. Because the control of the electronically commutated motor is very accurate, the condenser unit 220 operates very efficiently.

However, it has been found, surprisingly, that simultaneously reducing the rotation speed of the condenser fan and reducing the volume available in the condenser for the refrigerant increases the head pressure to an acceptable level, or maintains it at the acceptable level, in an optimal manner. As will be described, when the fan speed is decreased and, substantially simultaneously, the condenser volume is apportioned, the performance of the condenser unit of the invention (and the system in which it is included) is better than expected, based on the performance of the prior art devices in similar conditions. In the invention, therefore, the valve 225 is also controlled by the controller 238 (i.e., via the condenser control circuit 234) so as to result in apportionment of the condenser, to increase the head pressure further.

The controller 238 is configured to respond very quickly to the data for the preselected parameter(s) provided to the controller 238. In particular, the controller 238 determines when to change the speed of rotation of the condenser fan and/or the portion of the condenser that is utilized (i.e., in response to one or more changes in the data), and how much to so change. It has been found that, due to the prompt and precise response of the condenser unit 220 of the invention, the condenser unit 220 operates with optimal efficiency and optimal refrigerant use while maintaining the head pressure within the predetermined range.

The apportionment of the condenser involves controlling the flow of the refrigerant into the condenser so that only a part of the volume inside the condenser is utilized, i.e., using the flow control means 225 to do so. Because the refrigerant is condensed in a smaller volume inside the condenser, the condensing pressure is increased, to maintain an appropriate pressure differential across the expansion valve. In this way, apportioning the condenser contributes to increasing the head pressure. For example, the volume utilized may be one-half or one-third of the volume of the condenser. The proportion of the condenser volume utilized depends on the application (e.g., a cooler or a freezer) and the characteristics of the system.

As can be seen in FIG. 3, when the entire condenser 224 is utilized, the refrigerant is allowed to flow into the condenser via lines 246A and 246B. The refrigerant that flows into the condenser 224 via the line 246A exits a first part 248A of the condenser 224 via line 246C, and the refrigerant that flows into the condenser 224 via the line 246B exits a second part 248B via line 246D.

When the valve 225 is closed, refrigerant only flows through the line 246B, so that the refrigerant flows only into the second part 248B of the condenser. In this way, the refrigerant is directed into a portion of the condenser (i.e., the second part 248B), rather than the entire condenser. It is preferred that the condenser unit 220 also includes a check valve 250, to prevent refrigerant exiting via the line 246D from flowing into the line 246C, and into the first part 248A of the condenser 224.

Those skilled in the art would appreciate that the division of the condenser 224 into the first and second parts 248A, 248B that, as illustrated in FIG. 3, each represent about one-half of the total condenser capacity, is exemplary only. The condenser 224 may be structured so that it may be apportioned into as many parts as desired, having such proportions of the condenser as desired.

As can be seen in FIG. 5, in another embodiment, the condenser unit 220 preferably includes the transducer 240 and an ambient temperature sensor 242. Accordingly, in this embodiment, the preselected parameters preferably include the head pressure exerted by the superheated refrigerant vapor, and the ambient temperature of air proximal to the compressor. Those skilled in the art would appreciate that, instead of the transducer, the condenser unit 220 optionally could include a condenser temperature sensor (not shown).

In this situation, the controller 238 receives input data from each of the transducer 240 and the temperature sensor 242. The ambient temperature as measured helps to fine-tune the response (if any) to changes in head pressure as measured, as described above.

It will be understood that the arrows in FIGS. 3-5 indicate the direction of flow of the refrigerant.

Figure 6:
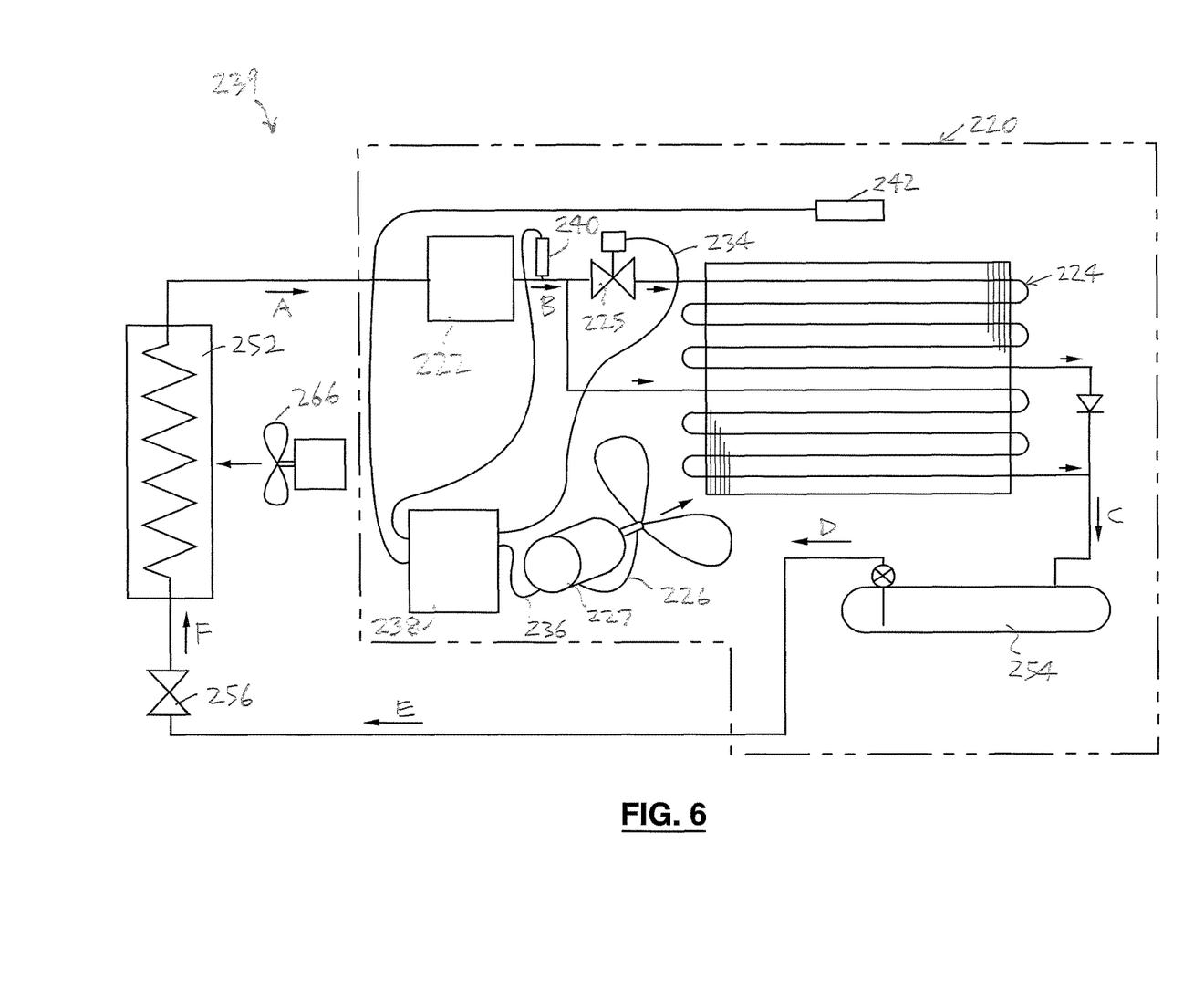
FIG. 6 is a schematic diagram of an embodiment of a vapor-compression system of the invention.

As can be seen in FIG. 6, the condenser unit of the invention preferably is included in the vapor-compression system 239 of the invention. Those skilled in the art would appreciate that any of the embodiments of the condenser unit of the invention may be included in the system 239.

The direction of travel of refrigerant is indicated in FIG. 6 by arrows, and for convenience, certain arrows identified in FIG. 6 as A, B, C, D, E, and F. The system 239, which includes the condenser unit 220, is illustrated in FIG. 6. As is well known in the art, the refrigerant exits an evaporator 252 included in the system 239 and enters the compressor 222. The superheated refrigerant vapor is directed to the condenser. The condenser unit 220 may, optionally, include a receiver 254. Liquid refrigerant exits the condenser and passes into the receiver 254. The liquid refrigerant exits the receiver 254 and passes through an expansion valve 256 included in the system 239, causing flash evaporation of at least a portion of the liquid refrigerant. The liquid and vapor refrigerant is then directed through the evaporator 252. An evaporator fan 266 (also included in the system 239) directs air from the space which is refrigerated across the evaporator tube(s). As described above, the controller 238 in the condenser unit 220 monitors conditions and adjusts so that the air-cooled condenser 224 provides the refrigerant at a pressure sufficient to provide an appropriate pressure differential across the expansion valve 256.

Advantageously, it has been determined that the invention results in no additional refrigerant use at a very low ambient temperature. That is, the invention has also been found to permit operation with significantly less refrigerant. Ultimately, this results in cost reduction, and is thought to be generally beneficial to the environment.

A number of tests were conducted of three different refrigeration systems including different arrangements of the compressor and the condenser. The test results are summarized in Tables 1A, 1B, and 1D below. The prior art systems tested and referred to in Tables 1A, 1B and 1D are freezers.

The "System with Flooding Valve" (referred to hereinafter as "System 1") is the prior art system illustrated in FIG. 2 and described above. The "System with Variable Speed Condenser Fan" (referred to hereinafter as "System 2") is a prior art system with a variable speed condenser fan, which does not include a flooding valve.

The "System with Portioned Condenser" (referred to hereinafter as "System 3") is a prior art system that includes only a portioned condenser, and does not include a flooding valve. It will be understood that the data provided in Table 1C is based on calculations, rather than measurements. The data in Tables 1A, 1B, and 1D is measurements, or resulting from calculations based on measurements.

An embodiment of the system of the invention (referred to hereinafter as "System 4"), in which both a variable speed condenser fan and apportionment of the condenser are utilized to maintain head pressure, was also tested, and the test results are in Table 1D below.

TABLE 1A

| Component | Units | Description | System with Flooding Valve Conventional | | | |
|---|---|---|---|---|---|---|
| | ° F. | Test Ambient | 100 | 30 | 10 | −20 |
| Evaporator | ° F. | Evaporator TD (TAirAve-TEvapSat) | 10.2 | 12.6 | 12.5 | 12.2 |
| | Btu/h | Evaporator Capacity | 8328 | 10878 | 10705 | 10799 |
| | W | Evaporator Watt consumption | 445 | 445 | 445 | 445 |
| | Btu/h/W | Efficiency of Evaporator | 18.7 | 24.4 | 24.1 | 24.3 |
| Compressor/ | psig | Pressure in Discharge line | 262.0 | 204.4 | 203.7 | 202.6 |
| Condensing | ° F. | Saturation Temp @ Condenser | 107.7 | 90.5 | 90.3 | 89.9 |
| Unit | psig | Pressure pre expansion valve | 259.2 | 185.7 | 184.5 | 182.3 |
| | Btu/h | Condenser Capacity | 13825 | 17964 | 18735 | 20175 |

TABLE 1A-continued

| | Units | Description | System with Flooding Valve Conventional | | | |
|---|---|---|---|---|---|---|
| Component | °F. | Test Ambient | 100 | 30 | 10 | −20 |
| | lb/h | System Mass Flow | 180.1 | 198.5 | 199.4 | 203.8 |
| | Btu/h | Compressor Capacity | 10595 | 11841 | 11276 | 10771 |
| | W | Compressor Watt Consumption | 2248 | 2176 | 2187 | 2210 |
| | lbs | Amount of Refrigerant required to run | 8.0 | 12.5 | 13.0 | 13.5 |
| | BTU/h/W | Efficiency of Condensing unit | 4.71 | 5.44 | 5.16 | 4.87 |

TABLE 1B

| | Units | Description | System with Variable Speed Condenser Fan (no flooding valve) Variable Speed Fan | | |
|---|---|---|---|---|---|
| Component | °F. | Test Ambient | 100 | 30 | 10 |
| Evaporator | °F. | Evaporator TD (TAirAve-TEvapSat) | 12.3 | 15.8 | 21.2 |
| | Btu/h | Evaporator Capacity | 7930 | 11785 | 12075 |
| | W | Evaporator Watt consumption | 445 | 445 | 445 |
| | Btu/h/W | Efficiency of Evaporator | 17.8 | 26.5 | 27.1 |
| Compressor/ | psig | Pressure in Discharge line | 261.2 | 136.4 | 93.8 |
| Condensing | °F. | Saturation Temp @ Condenser | 107.5 | 65.2 | 45.7 |
| Unit | psig | Pressure pre expansion valve | 258.9 | 132.2 | 89.6 |
| | Btu/h | Condenser Capacity | 13052 | 16348 | 15872 |
| | lb/h | System Mass Flow | 167.9 | 191.4 | 177.8 |
| | Btu/h | Compressor Capacity | 10124 | 12656 | 12660 |
| | W | Compressor Watt Consumption | 2171 | 1573 | 1345 |
| | lbs | Amount of Refrigerant required to run | 8.0 | 8.5 | 9.0 |
| | BTU/h/W | Efficiency of Condensing unit | 4.66 | 8.05 | 9.41 |

TABLE 1C

| | Units | Description | System with Portioned Condenser (no flooding valve) Portioned Condenser Only | |
|---|---|---|---|---|
| Component | °F. | Test Ambient | 100 | 30 |
| Evaporator | °F. | Evaporator TD (TAirAve-TEvapSat) | 10.0 | 20.0 |
| | Btu/h | Evaporator Capacity | 8300 | 12000 |
| | W | Evaporator Watt consumption | 445 | 445 |
| | Btu/h/W | Efficiency of Evaporator | 18.7 | 27.0 |
| Compressor/ | psig | Pressure in Discharge line | 262.0 | 105.0 |
| Condensing | °F. | Saturation Temp @ Condenser | 108.0 | 49.0 |
| Unit | psig | Pressure pre expansion valve | 259.0 | 102.0 |
| | Btu/h | Condenser Capacity | 14000 | 18000 |
| | lb/h | System Mass Flow | 182.0 | 190.0 |
| | Btu/h | Compressor Capacity | 10680 | 14500 |
| | W | Compressor Watt Consumption | 2240 | 1660 |
| | lbs | Amount of Refrigerant required to run | 8.0 | 10.3 |
| | BTU/h/W | Efficiency of Condensing unit | 4.77 | 8.73 |

TABLE 1D

| | Units | Description | Invention (condenser fan and flow control means) Invention | | | |
|---|---|---|---|---|---|---|
| Component | °F. | Test Ambient | 100 | 30 | 10 | −20 |
| Evaporator | °F. | Evaporator TD (TAirAve-TEvapSat) | 10.9 | 15.5 | 15.3 | 16.1 |
| | Btu/h | Evaporator Capacity | 8799 | 12025 | 12164 | 12641 |
| | W | Evaporator Watt consumption | 445 | 445 | 445 | 445 |
| | Btu/h/W | Efficiency of Evaporator | 19.8 | 27.0 | 27.3 | 28.4 |
| Compressor/ | psig | Pressure in Discharge line | 262.5 | 150.5 | 150.4 | 150.5 |

TABLE 1D-continued

| Component | Units | Description | Invention (condenser fan and flow control means) Invention | | | |
|---|---|---|---|---|---|---|
| | °F. | Test Ambient | 100 | 30 | 10 | −20 |
| Condensing Unit | °F. | Saturation Temp @ Condenser | 107.8 | 71.0 | 70.9 | 71.0 |
| | psig | Pressure pre expansion valve | 258.3 | 134.1 | 133.6 | 132.2 |
| | Btu/h | Condenser Capacity | 13752 | 15922 | 16021 | 16119 |
| | lb/h | System Mass Flow | 173.6 | 193.4 | 195.0 | 200.9 |
| | Btu/h | Compressor Capacity | 11426 | 13240 | 13081 | 13117 |
| | W | Compressor Watt Consumption | 2235 | 1676 | 1656 | 1671 |
| | lbs | Amount of Refrigerant required to run | 8.0 | 7.5 | 7.8 | 8.0 |
| | BTU/h/W | Efficiency of Condensing unit | 5.11 | 7.90 | 7.90 | 7.85 |

In Table 1B, there is no data for testing System 2 at an ambient temperature of −20° F. because that system did not function at that temperature.

As can be seen in Table 1B, System 2 does not function properly at an ambient temperature of 10° F. This is evident from the "TD" of 21.2, which is a mis-application, i.e., it indicates that the system is not functioning properly. Because the system tested is a freezer, the TD shown would result in too much moisture being taken out of the air in the controlled space.

When System 2 was tested at 10° F., the saturation temperature at the condenser was found to be 45.7° F. This is outside the compressor operating envelope and is likely to reduce the compressor's operating life.

Data based on a system adapted for only apportioning the condenser is provided in Table 1C. Such data is the result of calculations, rather than measurements. This system, in which only apportionment of the condenser is possible, is referred to as "System 3".

No data is provided in Table 1C for ambient temperatures of 10° F. or −20° F. because it was determined that System 3 could not function in these conditions. Also, the saturation temperature of 49° F. at the condenser (i.e., when the ambient temperature is 30° F.) is outside of the compressor operating envelope and is dangerous to the life of the compressor.

From the foregoing, some of the advantages of the invention are as follows.

(a) The efficiency of the evaporator in System 4 was the highest efficiency at the lowest ambient temperature (−20° F.).

(b) The −20° F. ambient temperature at which System 4 can operate efficiently is much lower than the lowest temperature (10° F.) at which System 2 can operate.

(c) In the testing summarized in Tables 1A-1C, it was intended that a head pressure of 150.5 psig was maintained. System 4 was able to achieve this when the ambient temperature was −20° F.

(d) In operating System 4 at −20° F., the saturation temperature at the condenser is 71.0° F., which is within the compressor design envelope and avoids any mis-application of the evaporator.

(e) In operating System 4 at −20° F., only eight pounds of refrigerant was needed. This is the lowest charge required.

(f) In operating System 4 at −20° F., it was discovered that the efficiency of the system (7851 BTU/h/W) was greater than System 1. System 4 was more efficient than System 1 throughout all of the ambient temperatures tested.

In summary, the testing and the calculations set out in Tables 1A-1D demonstrate that the condenser unit of the invention provides better results, and over a wider range of ambient temperatures, than are achievable using the corresponding assemblies of the prior art. The surprisingly good results are achieved by utilizing both variable condenser fan speed control and apportionment of the condenser, and by controlling the condenser unit so that it responds rapidly and precisely to changes in the ambient temperature.

It will be appreciated by those skilled in the art that the invention can take many forms, and that such forms are within the scope of the invention as described above. The foregoing descriptions are exemplary, and their scope should not be limited to the preferred versions provided therein.

We claim:

1. A method of operating a condenser unit for providing a volume of refrigerant at a pressure within a predetermined range sufficient to provide a preselected minimum pressure differential, the method comprising:

(a) compressing the refrigerant in vapor form in a compressor included in the condenser unit to provide a superheated refrigerant vapor exerting a head pressure;

(b) condensing the superheated refrigerant vapor in a condenser module contained within a single core included in the condenser unit to provide a liquid refrigerant, the condenser module being located in an uncontrolled space in which air surrounding the condenser module is at an ambient temperature;

(c) separating the condenser module into at least two segments, each segment including a separate refrigerant line;

(d) directly connecting the refrigerant line of a first segment of the condenser module to the compressor and providing a valve in the refrigerant line of a second segment of the condenser module controlled by a condenser control circuit for controlling movement of the superheated refrigerant vapor from the compressor into the second segment of the condenser module for discretely apportioning a selected volume available in the condenser module to receive the refrigerant;

(e) providing a fan control circuit for controlling a rate at which the refrigerant condenses in the condenser module by controlling a condenser fan motor included in the condenser unit to change a speed of rotation of a condenser fan positioned to move air over the condenser module;

(f) with a controller, controlling the valve and the condenser fan motor via the condenser control circuit and the fan control circuit respectively, to maintain the pressure within the predetermined range thereof, wherein the controller is configured:

when the pressure is below the predetermined range, to provide a gross adjustment to the pressure by selectively closing the valve associated with the second segment to reduce the selected volume available in the condenser module to receive the refrigerant and simultaneously to provide a refined adjustment to the pressure by selectively adjusting the speed of rotation of the fan, for increasing the pressure to within the predetermined range; and when the pressure is above the predetermined range, to provide a gross adjustment to the pressure by selectively opening the valve associated with the second segment to increase the selected volume available in the condenser module to receive the refrigerant, and simultaneously to provide a refined adjustment to the pressure by selectively adjusting the speed of rotation of the fan, for decreasing the pressure to within the predetermined range; and (g) wherein when the ambient temperature is below a threshold level, simultaneously (i) reducing the speed of rotation of the fan and (ii) reducing the selected volume available in the condenser module by closing off at least one of the segments of the condenser module.

2. A method of operating a refrigeration system for providing a refrigerant at a pressure within a predetermined range sufficient to provide a preselected minimum pressure differential, the method comprising:

(a) compressing the refrigerant in vapor form in a compressor included in the condenser unit to provide a superheated refrigerant vapor exerting a head pressure;

(b) condensing the superheated refrigerant vapor in a condenser module contained within a single core included in the condenser unit to provide a liquid refrigerant, the condenser module being located in an uncontrolled space in which air surrounding the condenser module is at an ambient temperature;

(c) separating the condenser module into two segments, each segment including a separate refrigerant line;

(d) causing the refrigerant to at least partially evaporate in an evaporator assembly through which the refrigerant is circulatable, to transfer heat to the refrigerant from air in a controlled space;

(e) directly connecting the refrigerant line of a first segment of the condenser module to the compressor and providing a valve in the refrigerant line of a second segment of the condenser module controlled by a condenser control circuit for controlling movement of the superheated refrigerant vapor from the compressor into the second segment of the condenser module for discretely apportioning a selected volume available in the condenser module to receive the refrigerant;

(f) providing a fan control circuit for controlling a rate at which the refrigerant condenses in the condenser module by controlling a condenser fan motor included in the condenser unit to change a speed of rotation of a condenser fan positioned to move air over the condenser module;

(g) with a controller, controlling the valve and the condenser fan motor via the condenser control circuit and the fan control circuit respectively, to maintain the refrigerant at a pressure within a predetermined range sufficient to provide an appropriate pressure differential across an expansion valve, wherein the controller is configured:

when the pressure is below the predetermined range, to provide a gross adjustment to the pressure by selectively closing adjust the valve associated with the second segment to reduce the selected volume available in the condenser module to receive the refrigerant and simultaneously to provide a refined adjustment to the pressure by selectively adjusting the speed of rotation of the fan in order to increase the pressure, until the pressure is within the predetermined range; and when the pressure is above the predetermined range, to provide a gross adjustment to the pressure by selectively opening the valve associated with the second segment to increase the selected volume available in the condenser module to receive the refrigerant and simultaneously to provide a refined adjustment to the pressure by selectively adjusting the speed of rotation of the fan in order to decrease the pressure, until the pressure is within the predetermined range; and (h) wherein when the ambient temperature is below a threshold level, simultaneously (i) reducing the speed of rotation of the fan and (ii) reducing the selected volume available in the condenser module by closing off at least one of the segments of the condenser module.

3. The method as recited in claim 1, further comprising:
determining that the pressure is below the predetermined range, providing a gross adjustment by closing the valve associated with the second segment to reduce the selected volume available in the condenser module to receive the refrigerant, and simultaneously providing a refined adjustment to the pressure by selectively increasing the speed of rotation of the fan, for adjusting the pressure to within the predetermined range; and
determining that the pressure is above the predetermined range, providing a gross adjustment by opening the valve associated with the second segment to increase the selected volume available in the condenser module to receive the refrigerant, and simultaneously providing a refined adjustment to the pressure by selectively decreasing the speed of rotation of the fan, for adjusting the pressure to within the predetermined range.

4. The method as recited in claim 1, wherein the two segments each represent fifty percent of a total volume available in the condenser module to receive the refrigerant.

5. The method as recited in claim 1, wherein there is at least a third segment for the condenser module, providing a valve between the compressor and the line of the third segment controlled by the condenser control circuit for controlling movement of the superheated refrigerant vapor from the compressor into the third segment of the condenser module for discretely apportioning the selected volume available in the condenser module to receive the refrigerant, the third segment selectively providing a more refined gross adjustment to the pressure when combined with the first segment and the second segment.

6. The method as recited in claim 1, the condenser fan always rotating so long as the refrigerant is moving through the condenser module.

7. The method as recited in claim 6, the fan circulating air over the second segment even when the valve is closed.

8. The method as recited in claim 1, decreasing the selected volume available in the condenser module to receive the refrigerant when the valve is closed.

9. The method as recited in claim 1, the controller relying on at least two preselected parameters related to the pressure, at least one of the parameters based on a temperature within the condenser unit.

10. The method as recited in claim 1, the single core surrounding each of the segments, the lines of each of the segments intersecting a perimeter of the single core.

11. The method as recited in claim 2, further comprising:
determining that the pressure is below the predetermined range, providing a gross adjustment by closing the valve associated with the second segment to reduce the selected volume available in the condenser module to receive the refrigerant, and simultaneously providing a refined adjustment to the pressure by selectively increasing the speed of rotation of the fan, for adjusting the pressure to within the predetermined range; and
determining that the pressure is above the predetermined range, providing a gross adjustment by opening the valve associated with the second segment to increase the selected volume available in the condenser module to receive the refrigerant, and simultaneously providing a refined adjustment to the pressure by selectively decreasing the speed of rotation of the fan, for adjusting the pressure to within the predetermined range.

12. The method as recited in claim 11, decreasing the selected volume available in the condenser module to receive the refrigerant when the valve is closed.

13. The method as recited in claim 11, the controller relying on at least two preselected parameters related to the pressure, at least one of the parameters based on a temperature within the condenser unit.

14. The method as recited in claim 11, the single core surrounding each of the segments, the lines of each of the segments intersecting a perimeter of the single core.

15. The method as recited in claim 11, wherein the two segments each represent fifty percent of a total volume available in the condenser module to receive the refrigerant.

16. The method as recited in claim 11, wherein there is at least a third segment for the condenser module, providing a valve between the compressor and the line of the third segment controlled by the condenser control circuit for controlling movement of the superheated refrigerant vapor from the compressor into the third segment of the condenser module for discretely apportioning the selected volume available in the condenser module to receive the refrigerant, the third segment selectively providing a more refined gross adjustment to the pressure when combined with the first segment and the second segment.

17. A method as recited in claim 1, the ambient temperature selectively ranging being between 100 degrees Fahrenheit and −20 degrees Fahrenheit.

18. A method as recited in claim 1, making each segment the same volume.

19. A method as recited in claim 2, the ambient temperature selectively ranging being between 100 degrees Fahrenheit and −20 degrees Fahrenheit.

20. A method as recited in claim 2, making each segment the same volume.

* * * * *